Oct. 17, 1961     D. A. COOKE ET AL     3,004,506
VARIABLE ENABLER

Filed Nov. 4, 1953     2 Sheets-Sheet 1

INVENTORS
DAVID A. COOKE
ROBERT H. KITTLEMAN
BY
G. D. O'Brien
E. C. Walsh
ATTORNEYS Oct. 17, 1961 D. A. COOKE ET AL 3,004,506
VARIABLE ENABLER
Filed Nov. 4, 1953 2 Sheets-Sheet 2

INVENTORS
DAVID A. COOKE
ROBERT H. KITTLEMAN
BY
G. D. O'Brien
E. C. Walsh
ATTORNEYS United States Patent Office 3,004,506
Patented Oct. 17, 1961

3,004,506
VARIABLE ENABLER
David A. Cooke and Robert H. Kittleman, Sharon, Pa., assignors, by mesne assignments, to the United States of America as represented by the Secretary of the Navy
Filed Nov. 4, 1953, Ser. No. 390,268
6 Claims. (Cl. 114—20)

This invention relates to an acoustic torpedo and in particular to a variable enabler for such a torpedo which turns on, energizes, or enables, the acoustic guidance means of the torpedo after the torpedo has traveled a predetermined distance from its launching point, and which prevents the acoustic guidance means from being enabled until after the torpedo has traveled a minimum distance from its point of launching.

The acoustic guidance means of acoustic torpedoes have a maximum range at which a target can be detected. To prevent an acoustic torpedo from attacking the vessel from which it was launched, it is desirable to incorporate in the torpedo means which will prevent enabling of the acoustic guidance means until the torpedo has traveled a distance from its launching vessel which is greater than the maximum range at which the acoustic guidance means can pick up a target. Further, in torpedoes having active acoustic guidance means, the active acoustic guidance means may be detected by the vessel being attacked, which vessel can then take evasive action, if given sufficient warning, and can determine the approximate location of the submarine from which the torpedo was launched. It is, therefore, desirable not to enable the active acoustic guidance means until the torpedo is substantially within pickup range of the vessel to be attacked.

It is, therefore, an object of this invention to provide a variable enabler which will enable the acoustic guidance means of a torpedo after the torpedo has traveled a predetermined distance from the launching vessel.

It is a further object of this invention to provide a variable enabler which will enable the acoustic means of a torpedo after it has traveled a preselected distance from the launching vessel, but only after the torpedo has traveled a predetermined minimum distance which is greater than the maximum distance which the acoustic guidance means can detect a target, which distance will be subsequently identified as being the minimum enabling distance.

It is another object of this invention to provide a variable enabler which personnel in the launching vessel may determine the preselected distance at which the acoustic guidance means of a torpedo wil be enabled while the torpedo is in its launching tube and which variable enabler prevents an incorrect setting from enabling the acoustic guidance means of the torpedo until the torpedo has traveled the minimum enabling distance from the launching vessel.

Other objects and many of the attendant advantages of this invention will be readily appreciated as the same become better understood by reference to the following detailed description when considered in connection with the accompanying drawings wherein.

Figure 1:
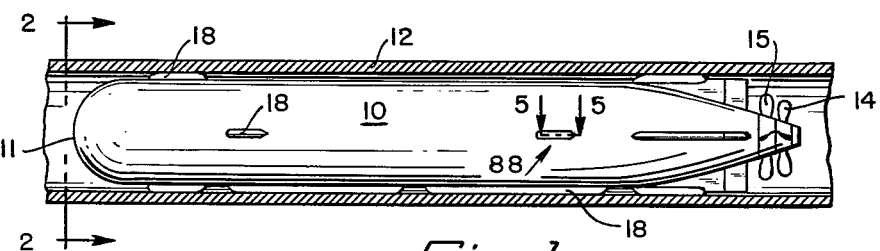
FIG. 1 is a longitudinal central section through a torpedo tube with an acoustic torpedo located therein.
Figure 2:
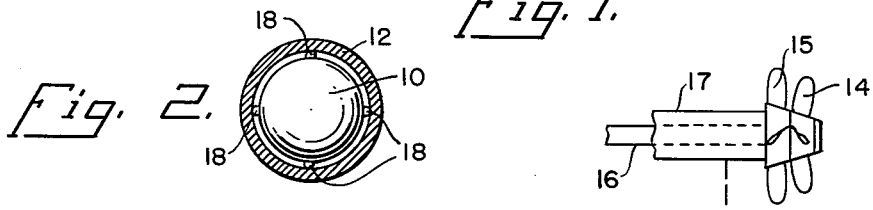
FIG. 2 is a section taken on line 2—2, FIG. 1.

In FIG. 1, an acoustic torpedo 10, in which the variable enabler of this invention is adapted to be incorporated, is shown within a launching device; i.e. torpedo tube 12, which may be located in a submarine which is not illustrated. Torpedo 10 is provided with contrarotating propellers 14, 15, which are secured for rotation with inner propeller shaft 16 and outer propeller shaft 17, respectively. Torpedo 10 may be powered by conventional means, which are not illustrated, such as an electric motor powered by batteries. The outer diameter of the shell 11 of torpedo 10 is substantially less than the internal diameter of tube 12. A plurality of vanes, or ribs, 18 equiangularly placed around torpedo 10 make torpedo 10 concentric with tube 12. This arrangement permits torpedo 10 to swim out of tube 12 under its own power without the necessity of forcing torpedo 10 out by compressed air, for example. An advantage of launching a torpedo in this manner is that little or no noise is created when the torpedo swims out of the tube, such as occurs when compressed air is used. Another advantage is that compressed air forms a large bubble, which can aid an enemy in locating the submarine from which torpedo 10 is fired or launched.

Figure 3:
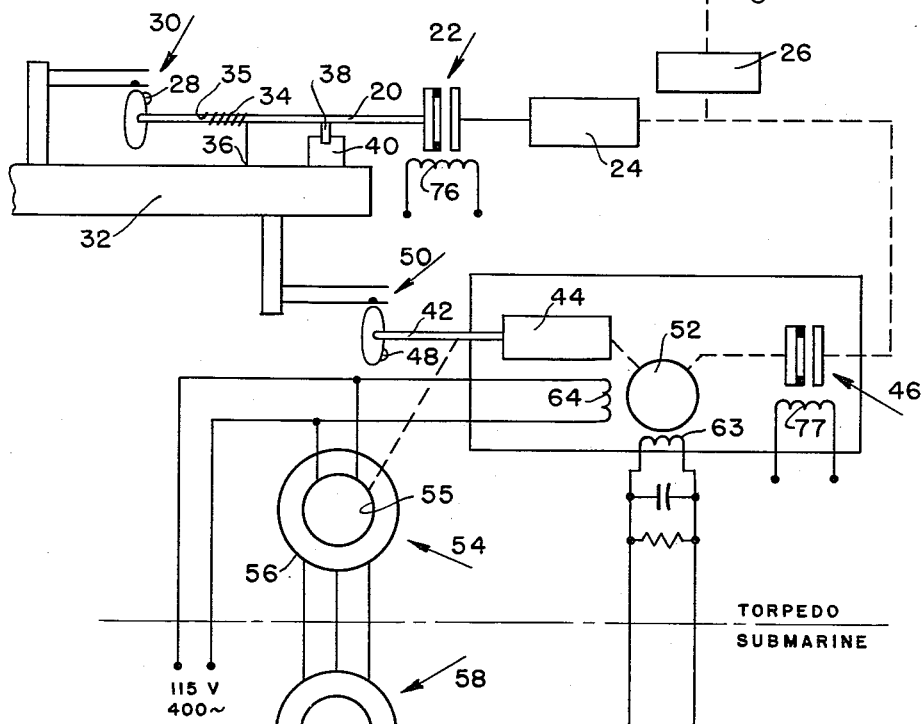
FIG. 3 is a schematic diagram of the electrical and mechanical components of the invention.

Once torpedo 10 is substantially clear of torpedo tube 12, it will progress through the water a substantially constant distance for each revolution of its propeller 14, 15. This is true whether the tropedo has a single propeller, or has dual contrarotating propellers as illustrated in FIG. 1. Thus the distance a torpedo has traveled is a function of the number of revolutions of its propellers, or of the number of revolutions of the shafts to which the propellers are secured. This principle is used in this invention to determine the distance that torpedo 10 has traveled. Referring now to FIG. 3, shaft 20 is connected through electromagnetically operated clutch 22, reducing gear 24 and reducing gear 26 to the outer propeller shaft 17 of torpedo 10. The ratio of gears 24 and 26 is such that when clutch 22 is engaged, shaft 20 will complete one revolution while shaft 17 turns through a predetermined number of revolutions which correspond to the minimum enabling distance for torpedo 10. In a preferred form the shaft 20 is adapted to complete one turn while propeller shaft 17 turns through a number of revolutions corresponding to torpedo 10 having traveled 1000 yards. Cam 28 is secured to shaft 20 and is adapted to engage and close cam contacts 30, which are secured to frame 32 which in turn is secured to shell 11 of torpedo 10. Spring 34 has one of its ends 35 secured to shaft 20 and the other end 36 secured to frame 32. Projection 38 is secured to shaft 20 and adapted to engage stop 40 which is mounted on frame 32. When clutch 22 is not energized, spring 34 will rotate shaft 20 until projection 38 engages stop 40. Cam 28 is then located relative to cam contacts 30 so that substantially a complete revolution of shaft 20 is necessary before contacts 30 are closed.

Shaft 42 is connected through reduction gears 44, electromagnetically operated clutch 46 and gears 26 to propeller shaft 17. The ratio of gears 26 and 44 is such that when clutch 46 is engaged, shaft 42 will complete one revolution while shaft 17 turns through a predetermined number of revolutions which correspond to a fixed distance of travel of torpedo 10. In a preferred form shaft 42 is adapted to complete one revolution while propeller shaft 17 turns through a number of revolutions corresponding to the torpedo having traveled 36,000 yards. Cam 48 is secured to shaft 42 and is adapted to engage and close cam contacts 50 which are mounted on frame 32.

Two phase A.C. servo motor 52 is connected through gears 44 to shaft 42 so that shaft 42 can be oriented to an initial position before torpedo 10 is fired. The amount that shaft 42 must rotate before cam 48 engages cam contacts 50 corresponds to a preselected distance of travel of torpedo 10, and the preselected distance can have any value in the range of from zero to 36,000 yards in the preferred example.

To permit the initial orientation of shaft 42 to be accomplished while the torpedo is in the torpedo tube and at any time prior to the torpedo being launched, a synchro generator 54 which is located within torpedo 10 has its rotor 55 connected to shaft 42. The windings of the stator 56 of generator 54 are connected to the windings of the stator 57 of synchro control transformer 58 which is located in the submarine. The position of rotor 59 of transformer 58 can be calibrated in terms of the preselected distance the torpedo is to travel before the acoustic system is enabled. The error signal induced in rotor 59 is then applied to a conventional damping network 60, a conventional harmonic filter 61, and a servo-amplifier 62. The output of amplifier 62 is connected to the winding 63 of one phase of servo motor 52. The other winding 64 of the second phase of motor 52 is adapted to be energized by single phase 400 cycle 115 volts alternating current, for example, as is the rotor 55 of synchro generator 54. The servo loop including motor 52, synchro generator 54, synchro control transformer 58, damping network 60, filter 61 and servo amplifier 62 allows shaft 42 to be oriented to any desired position, corresponding to a preselected distance the torpedo 10 is to travel before cam contacts 50 are closed by cam 48.

Figure 4:
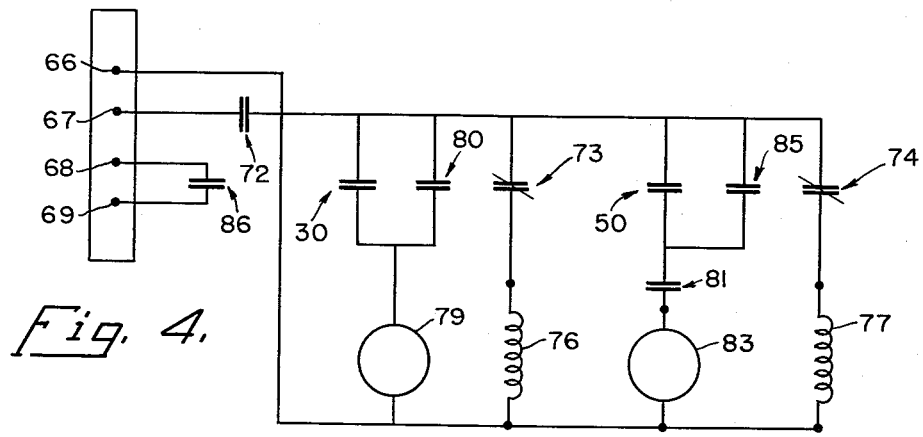
FIG. 4 is a wiring diagram.

Referring now to FIG. 4, terminal 66 is at ground potential, terminal 67 is at −24 volts D.C., terminal 68 is at +B potential and terminal 69 is connected to the acoustic guidance means. Contacts 72 are adapted to be closed by a vane switch illustrated in FIG. 5 as torpedo 10 leaves torpedo tube 12 as will be explained later. Contacts 73 and 74 are initially closed so that a direct current will energize windings 76 and 77 of electromagnetic clutches 22 and 46 when contacts 72 are closed. When energized, clutches 22, 46 connect shafts 20 and 42 to propeller shaft 17. After the torpedo has traveled the minimum enabling distance after contacts 72 are closed, shaft 20 will have substantially completed one revolution and cam contacts 30 will be closed by cam 28. The closing of contacts 30 permits current to flow through the coil of a conventional relay 79. When relay 79 is energized, it closes contacts 80, so that relay 79 is sealed in, opens contacts 73 of clutch 22, so that shaft 20 is no longer connected to propeller shaft 17, and closes contacts 81.

When the torpedo has traveled, after contacts 72 are closed, the preselected distance cam contacts 50 are closed, and since contacts 81 were closed by the operation of relay 79, relay 83 is energized. When relay 83 is energized, contacts 85 are closed to seal in relay 83, contacts 74 are opened so that clutch 46 no longer connects shaft 42 to propeller 17, and contacts 86 are closed so that +B voltage is applied to the acoustic guidance means of torpedo 10. The acoustic guidance means is then enabled and capable of guiding the torpedo to a target. Relay 83 can also arm an exploder of the torpedo and disable, or render inoperative, an anti-circular run device of the torpedo if such is incorporated therein.

Figure 5:
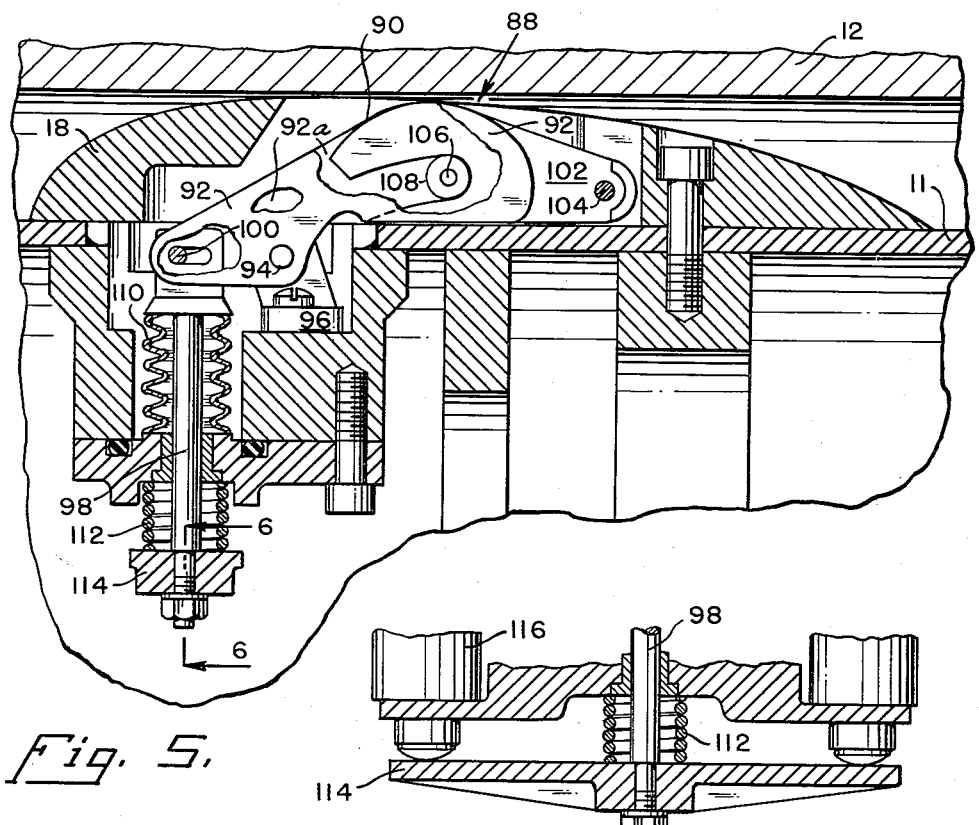
FIG. 5 is an enlarged section taken on line 5—5 of FIG. 1, portions being broken away.
Figure 6:
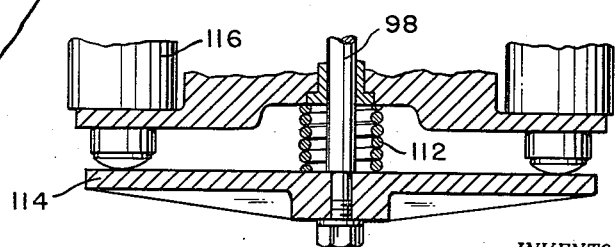
FIG. 6 is a section taken on line 6—6, FIG. 5.

FIG. 5 is a sectional view of vane switch 88 which is located in the rear portion of torpedo 10. Lever 90 is formed of two identical plate-like members 92, 92a, which are secured together and in spaced relationship. Lever 90 is pivotally mounted on pin 94 which is secured to bracket 96 which in turn is secured to the shell 11 of torpedo 10. A portion of bracket 96 is located between elements 92, 92a of lever 90. Rod 98 has one end connected between elements 92, 92a by pin 100. Lever 102 is pivotally secured to vane 18 by pin 104 and has a portion thereof extending between the elements 92, 92a of lever 90. Bearing shaft 106, which is mounted between elements 92, 92a and bearing 108 require levers 90, 92 to rotate together about pins 94 and 104, respectively. Bellows 110 which is secured to rod 98 and to shell 11 permits rod 98 to move parallel to its longitudinal axis, but prevents water from entering within torpedo shell 11. Compression spring 112 which acts against shell 11 and against beam 114 which is secured to rod 98 exerts a force on rod 98 tending to cause it to move further into shell 11 of torpedo 10. While torpedo 10 is within the torpedo tube 12, levers 90 and 102 are kept substantially in the position illustrated in FIG. 5. When levers 90 and 102 clear the torpedo tube, spring 112 causes these levers to rotate which in turn permits rod 98 to move further into torpedo 10. The movement of rod 98 and beam 114 actuates switch 116 which is secured to shell 11 and beam 114. Switch 116 is then operative to close contacts 72 of FIG. 4.

In operation, torpedo 10 is placed within torpedo tube 12 prior to its being fired or launched. A plurality of electrical circuits interconnect the submarine and torpedo 10, only a portion of which are illustrated in FIG. 3, so that the guidance and control means which determine how the torpedo will operate can be adjusted. These circuits also permit the motor of the torpedo to be started when it is desired to have the torpedo swim out of tube 12. Prior to launching, contacts 73, 74 of FIG. 4 are closed and all other contacts shown in FIG. 4 are open. Clutches 22 and 46 are not energized so that shafts 20 and 42 are not connected to propeller shaft 17. Spring 34 is free to rotate shaft 20 so that cam 28 is positioned relative cam contacts 30 so that substantially a complete revolution of shaft 20 is required before cam contacts 28 close cam contacts 30. Since one revolution of shaft 20 corresponds to the torpedo having traveled the minimum enabling distance, cam contacts 30 will not be closed until the torpedo has traveled from its launching point the minimum enabling distance.

Shaft 42 may be positioned to correspond to the position of rotor 59 of synchro control transformer 58 which is located within the submarine. The preselected distance which the torpedo should travel before the acoustic system is enabled is determined by suitable means and this information is used to position rotor 59. The servo loop causes shaft 42 to assume the same position. The distance that shaft 42 must rotate before cam 48 engages cam contacts 50 is equivalent to the preselected distance. The servo loop permits the adjustment of the position of shaft 42 to be varied continuously, if desired, up to the time that the torpedo is launched.

When it is desired to launch torpedo 10, its motor is energized and the circuits between the torpedo 10 and the submarine are severed. While torpedo 10 is still in torpedo tube 12, the assumption that the torpedo will travel a given constant distance for each revolution of its propellers is not valid. Therefore, to avoid possible error in determining the minimum enabling distance and the preselected distance, clutches 22 and 46 are not energized until vane switch 88 has cleared the torpedo tube at which time torpedo 10 is substantially clear of tube 12. After clutch 22 is energized, shaft 20 will be driven by propeller shaft 17. When shaft 20 has turned through substantially a complete revolution, which corresponds to the torpedo having traveled the minimum enabling distance, cam contacts 30 are closed by cam 28. Relay 79 is energized, seals itself in, opens contact 73 and closes contact 81. When clutch 22 is deenergized by the opening of contact 73, shaft 20 is disconnected from propeller shaft 17.

When the torpedo 10 has traveled the preselected distance after contacts 72 are closed, cam contacts 50 are closed by cam 48 so that relay 83 is energized, seals itself in, deenergizes clutch 46, enables the acoustic guidance means of the torpedo, and performs such other functions as may be desired.

By arranging the circuitry as shown in FIG. 4, relay 83 cannot be energized until cam contacts 30 are or have been, closed, or until the torpedo has traveled the minimum enabling distance. Thus shaft 20, cam 28, and cam contacts 30 prevent premature enabling of the acoustic guidance means of the torpedo even if shaft 42 is improperly positioned through inadvertence, accident, or mistake so that cam contacts 50 will close before torpedo 10 has traveled the minimum enabling distance. Thus it is impossible by incorrect setting of shaft 42 to cause the acoustic guidance means of torpedo 10 to be enabled before the torpedo has traveled the minimum enabling distance.

If shaft 42 is set to correspond to a preselected distance less than the minimum enabling distance, and cam 48 is sufficiently wide to keep contacts 50 closed while the torpedo 10 travels the minimum enabling distance, then the acoustic guidance means can be enabled when cam contacts 30 are closed. Under the same conditions except that cam 48 is very narrow, the acoustic guidance means will not be enabled since cam contacts 50 can close and then open before cam contacts 30 close.

Obviously many modifications and variations of the present invention are possible in the light of the above teachings. It is therefore to be understood that within the scope of the appended claims the invention may be practiced otherwise than as specifically described.

What is claimed is:

1. In a torpedo of the type having acoustic guidance means, and having a propeller adapted to be rotated by a propeller shaft to drive said torpedo a substantially constant distance per revolution of said propeller and shaft, the improvements comprising; a first shaft connected by a first clutch and first reduction gears to said propeller shaft, said first shaft adapted to turn through one revolution while said torpedo travels a minimum enabling distance, means for orienting said first shaft to a preselected angular position, a first cam on said first shaft, first cam contact mounted on said torpedo, said first cam contacts adapted to be closed by said first cam after said torpedo has substantially traveled said minimum enabling distance after said first clutch connects said first shaft to said propeller shaft, a second shaft connected by second reduction gears and a second clutch to said propeller shaft, said second shaft adapted to turn through one revolution while said torpedo travels a predetermined distance, means for orienting said second shaft to any selected position, a second cam on said second shaft, second cam contacts on said torpedo, said second cam contacts adapted to be closed by said second cam after said torpedo has traveled a preselected distance corresponding to the selected position of the second shaft after the second clutch connects said second shaft to said propeller shaft, means for engaging said first and second clutches after said torpedo is launched, and circuit means interconnecting said first cam contacts, said second cam contacts and said acoustic guidance means and adapted to energize said acoustic guidance means when said second cam contacts are closed after said first cam contacts have closed.

2. In a torpedo of the type having acoustic guidance means, having a propeller adapted to be rotated by a propeller shaft to drive said torpedo through water a substantially constant distance per revolution of said propeller, and adapted to swim out of a launching tube, the improvements comprising; a first shaft connected by a first electro-magnetically operated clutch and first reduction gears to said propeller shaft, said first shaft adapted to turn through one revolution while said torpedo travels a minimum enabling distance after said first shaft is connected to said propeller shaft by said first clutch, means for orienting said first shaft to a preselected position, a first cam on said first shaft, first cam contacts on said torpedo, said first cam contacts adapted to be closed by said first cam after said torpedo has substantially traveled said minimum enabling distance after said first clutch has connected said first shaft to said propeller shaft, a second shaft connected by second reduction gears and a second electro-magnetically operated clutch to said propeller shaft, said second shaft adapted to turn through one revolution while said torpedo travels a substantially predetermined distance which is greater than said minimum enabling distance, means for orienting said second shaft to any selected position, a second cam on said second shaft, second cam contacts on said torpedo, said second cam contacts adapted to be closed by said second cam after said torpedo has traveled a preselected distance, corresponding to the selected position of the second shaft, after said second clutch connects said second shaft to said propeller shaft, means for energizing said first and second clutches to connect said first and second shafts to the propeller shaft after said torpedo has substantially cleared the launching tube, and circuit means interconnecting said first and second cam contacts and said acoustic guidance means and adapted to energize said acoustic guidance means when said second cam contacts are closed after said first cam contacts have closed.

3. In the combination of claim 2 in which the means for orienting said first shaft comprise a projection on said first shaft, a mechanical stop on the torpedo adapted to engage said projection, spring means on said shaft adapted to rotate said shaft so that said projection engages said stop when said first clutch disconnects said first shaft from said propeller shaft.

4. In the combination of claim 2 in which means for orienting said second shaft includes a servo motor connected to said second shaft, and means for controlling said servo motor.

5. In the combination of claim 2 in which the means for orienting said second shaft comprises a servo motor connected to said second shaft, a synchro generator connected to said second shaft, a synchro control transformer, and a servo amplifier, said synchro control transformer and said servo amplifier adapted to be located outside said torpedo, and circuit means interconnecting said servo motor, said synchro generator, said synchro control transformer and said servo amplifier whereby the position of said second shaft is controlled by said synchro control transformer.

6. In the combination of claim 2 in which the means for orienting said second shaft comprises a two phase A.C. servo motor connected to said second shaft, a synchro generator having its rotor connected to said second shaft, a synchro control transformer, and servo amplifier outside said torpedo, means interconnecting said servo motor, synchro generator, synchro control transformer and servo amplifier, whereby the position of said second shaft can be controlled by the position of the rotor of the synchro control transformer.

References Cited in the file of this patent

UNITED STATES PATENTS

| 1,346,264 | Shelton | July 13, 1920 |
| 2,396,463 | Hammond | Mar. 12, 1946 |
| 2,615,416 | Daly | Oct. 28, 1952 |